(12) United States Patent
Hägele et al.

(10) Patent No.: US 11,827,232 B2
(45) Date of Patent: Nov. 28, 2023

(54) HIGH ACCURACY VEHICLE LOAD MANAGEMENT

(71) Applicant: Continental Automotive Systems, Inc., Auburn Hills, MI (US)

(72) Inventors: Felix Hägele, Neustadt am Rübenberge (DE); Matthew Letizio, Farmington Hills, MI (US); Joseph Cholag, Shelby Township, MI (US); Daniel Gregory Goodrich, Cedarville, MI (US); Harald Schaumburg, Sarstedt (DE); Frank Wolters, Süpplingenburg (DE); Klaus Wenger, Apelern (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/446,511

(22) Filed: Aug. 31, 2021

(65) Prior Publication Data

US 2022/0234598 A1    Jul. 28, 2022

Related U.S. Application Data

(60) Provisional application No. 63/199,754, filed on Jan. 22, 2021.

(51) Int. Cl.
*B60W 40/13* (2012.01)
*B60W 30/184* (2012.01)

(52) U.S. Cl.
CPC .......... *B60W 40/13* (2013.01); *B60W 30/184* (2013.01); *B60W 2040/1307* (2013.01); *B60W 2510/222* (2013.01)

(58) Field of Classification Search
CPC ............... B60W 40/13; B60W 30/184; B60W 2040/1307; B60W 2510/222
See application file for complete search history.

(56) References Cited

U.S. PATENT DOCUMENTS

| | | | | |
|---|---|---|---|---|
| 6,036,201 A | * | 3/2000 | Pond ...................... | B60G 15/12 280/5.514 |
| 2004/0224812 A1 | * | 11/2004 | Tweet .................. | B60K 17/346 475/231 |
| 2008/0073138 A1 | * | 3/2008 | Asogawa ............. | B62D 5/0418 180/209 |

(Continued)

FOREIGN PATENT DOCUMENTS

| | | |
|---|---|---|
| DE | 102017009146 A1 | 4/2018 |
| EP | 2805839 A2 | 11/2014 |

(Continued)

OTHER PUBLICATIONS

International Search Report and Written Opinion dated May 6, 2022 from corresponding International patent application No. PCT/US2022/070301.

*Primary Examiner* — Yazan A Soofi
*Assistant Examiner* — Naeem Taslim Alam

(57) ABSTRACT

A method of calculation a vehicle load comprising calculating a first vehicle load value based at least on air pressures in air springs and height data of suspension of a vehicle axle, determining a second vehicle load value based on a change of track width of the vehicle axle, and calculating the vehicle load based on the first vehicle load value and the second vehicle load value.

16 Claims, 4 Drawing Sheets

(56) References Cited

U.S. PATENT DOCUMENTS

| | | | |
|---|---|---|---|
| 2014/0190753 A1* | 7/2014 | Mian | G01G 23/002 |
| | | | 177/136 |
| 2016/0368493 A1* | 12/2016 | Driscall | B66F 9/0755 |
| 2017/0225535 A1* | 8/2017 | Batsch | B60G 17/0195 |
| 2019/0176562 A1* | 6/2019 | Ohashi | B60G 17/0523 |
| 2020/0164703 A1* | 5/2020 | Singh | B60C 23/064 |
| 2021/0140812 A1* | 5/2021 | Weigert | G07C 5/085 |
| 2022/0055436 A1* | 2/2022 | Kizu | B60G 17/0523 |

FOREIGN PATENT DOCUMENTS

| | | |
|---|---|---|
| GB | 2387582 A | 10/2003 |
| WO | 2009055841 A1 | 5/2009 |

* cited by examiner

HIGH ACCURACY VEHICLE LOAD MANAGEMENT

CROSS-REFERENCE TO RELATED APPLICATION(S)

This application claims the benefit of U.S. Provisional Application No. 63/199,754 filed on Jan. 22, 2021, in the U.S. Patent and Trademark Office, the entire content of which is herein incorporated by reference.

BACKGROUND

1. Field

The present disclosure relates to automotive vehicles and more particularly to a vehicle load calculation for an air suspension system of an automotive vehicle.

2. Description of Related Art

Suspension systems for automotive vehicles provide vehicle passengers with a more comfortable ride. Demand from vehicle owners for improved comfort, fuel economy, and more controls and options has led to the development of adjustable air suspension systems. Depending on the current driving surface, different suspension operating modes may be selected by the vehicle operator. The suspension operating modes have preset suspension parameters to provide the ideal suspension arrangement for various driving situations. Typical operating modes a driver may select include, a standard driving mode, such as a comfort or sport mode, a snow mode, an off-roading mode, etc. In addition to providing selected operating modes for various driving situations the suspension system may be adjusted when select operating conditions are met.

An air suspension system has four corner assemblies. One corner assembly is located at a suspension position corresponding to each of the wheel corners for the vehicle. An air supply unit including an electronic control unit is connected to the corner assemblies. The air supply unit is capable of independently adjusting the corner assemblies. A vehicle load calculation system comprises a plurality of height sensors each associated with a corner assembly to measure the current ride height and at least a pressure to measure the current pressure in each air spring.

For load detection the data of the pressure sensor and the several ride height sensors are used. The pressure sensor senses the air pressure in each air spring. The ride height sensors measure the current ride height at each corner assembly. The signals of those sensors are combined to determine the current vehicle load.

The vehicle load at the individual corner assemblies can be calculated based on the data from the pressure sensor and the plurality height sensors. The vehicle load at each corner is used to calculate at least one load dependent vehicle characteristic which can be used by a vehicle system to adjust at least one vehicle operating parameter to compensate for the at least one load dependent vehicle characteristic.

The accuracy of load detection is mainly limited by the fact, that only these signals are used the determine the current vehicle load. But the vehicle frame and more specific the corner assemblies are affected by other forces, which are not considered on determination of the vehicle load.

This results in limited accuracy of the load detection algorithm. The inaccurate detected vehicle load leads to false air pressure in the air springs. The air springs could become damaged in a case of high dynamic pressure during driving. Furthermore, an inaccurate vehicle load leads to false operations of dynamic vehicle stability control systems critical to vehicle safety.

The background description provided herein is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

SUMMARY

A vehicle load calculation system comprising an air suspension system having at least four corner assemblies, wherein one corner assembly is located at a suspension position corresponding to each of the wheel corners for the vehicle and the corner assemblies each comprising an air spring; wherein at least two of the corner assemblies are associated with a vehicle axle. An air supply unit, wherein the air supply unit is capable of independently adjusting the air springs from one another. A pressure sensor located at a valve block of the air supply unit, wherein the pressure sensor is capable of measuring the air pressure in each air spring. A plurality of height sensors, wherein one of the height sensors is located at the suspension position corresponding to each of the wheel corners for the vehicle, wherein each height sensor is capable of measuring a height for an associated corner assembly. An electronic control unit connected to the corner assemblies, wherein the electronic control unit includes instructions for calculating a vehicle load. A first vehicle load value is calculated based at least upon the data of the pressure sensor and a plurality of height sensors associated to the vehicle axle. A second vehicle load value is determined based on the change of track width of the vehicle axle. At least the second vehicle load value is subtracted from the first vehicle load value to calculate the vehicle load.

A method of calculation a vehicle load comprising measuring for one of a plurality of air pressures in a plurality of air springs, wherein each air spring is associated with a corner assembly located at a suspension position corresponding to each of the wheel corners for a vehicle. Measurement of a plurality of heights sensors at the suspension position corresponding to each of the wheel corners for the vehicle. Calculating a first vehicle load value with an electronic control unit based at least on the measured pressure and height data of a vehicle axle, wherein at least two of the corner assemblies are associated with the vehicle axle. Determining a second vehicle load value with the electronic control unit which is based on the change of track width of the vehicle axle. Calculating the vehicle load by at least subtracting the second vehicle load value from the first vehicle load value.

To compensate the inaccurate vehicle load determination an acting vertical force due to a change of track width of the first vehicle axle is considered in the load detection algorithm. Tension forces are acting on the suspension while the track width of the first axle is changed. Those forces are effective when the vehicle is for example lowered in a stationary state due to a change of load. This leads to a false vehicle load determination.

Due to the trajectory of a wheel there is a kinematic coloration between the track width and the change of height of the vehicle. If the vehicle is loaded the height lowers and the track width increases. By that an additional force is applied to the corner assemblies due to the change of track width. This force is acting in the opposite way compared to the load forces.

The vehicle load is determined by calculation the vehicle load based on the information of the pressure sensor and the plurality of height sensors, while the acting force based on the changed track width is subtracted. This leading to a more accurate vehicle load. A corrected vehicle load or a corrected axle load is calculated based on the pressure signal, the height signal and the acting forces due to changes of the track width.

The described calculation of a vehicle load is not limited to a single vehicle axle. This vehicle load calculation can be also performed on the other vehicle axle. Both calculated vehicle load values are then combined to an overall vehicle load.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

Figure 1:
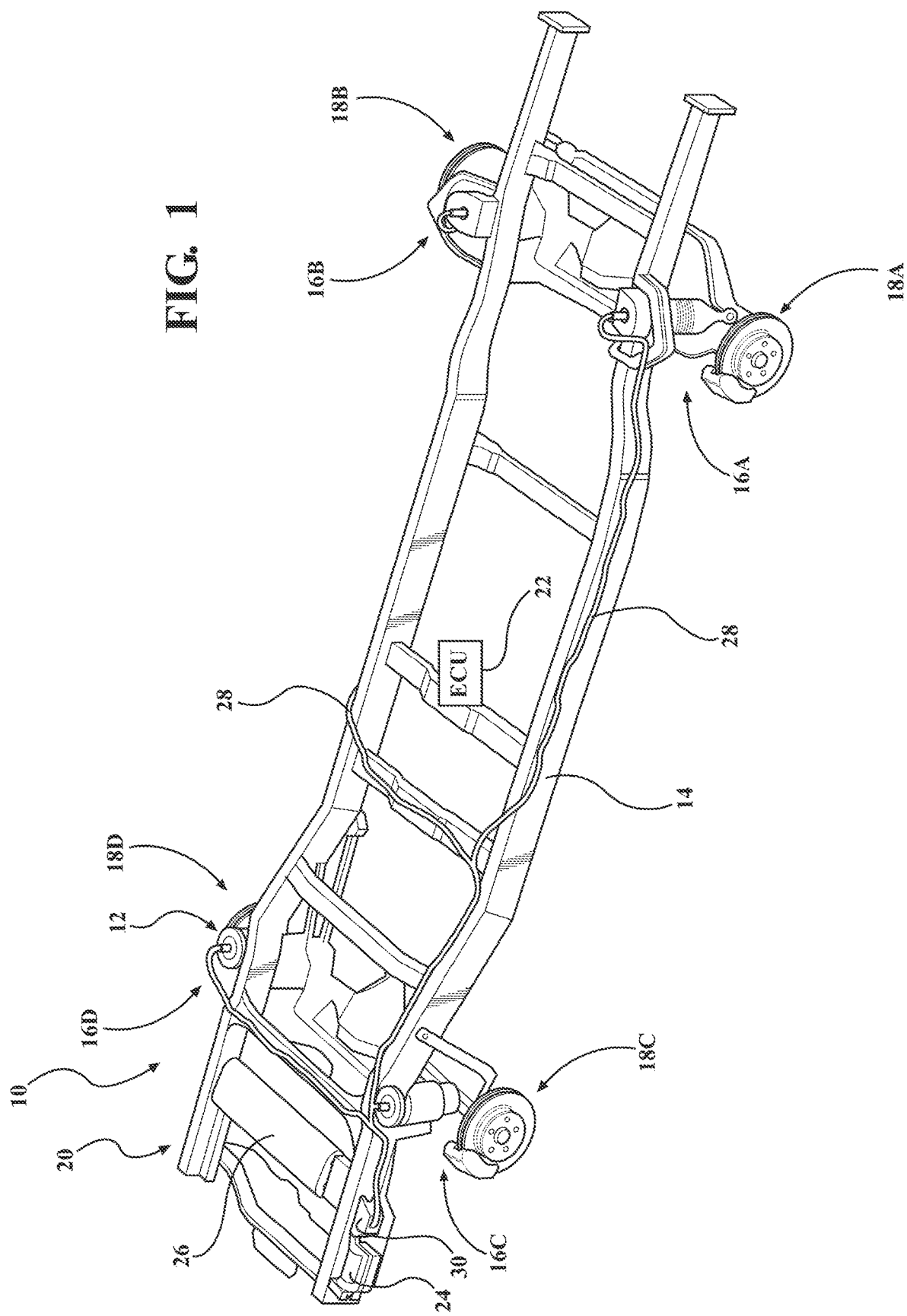
FIG. 1 is a schematic illustration of an air suspension system according to an embodiment.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

The following description is merely exemplary in nature and is in no way intended to limit the disclosure, its application, or uses. For purposes of clarity, the same reference numbers will be used in the drawings to identify similar elements.

FIG. 1 illustrates a vehicle 10, in this instance a pickup truck. Vehicle 10 includes an air suspension system 12. The air suspension system 12 is supported by a frame 14. The air suspension system has four corner assemblies 16A-D located at each of the wheel 18 locations of the vehicle 10. The four corner assemblies 16A-D may be independently adjustable. Two corner assemblies 16A, B are located at the front wheel 18A, B corners of the vehicle 10 and two corner assemblies 16C, D are located at the rear wheel 18C, D corners of the vehicle. The two corner assemblies 16A, B are associated with a first axle of the vehicle 10 and the two corner assemblies 16C, D are associated with a second axle of the vehicle 10.

The air suspension system 12 includes an air supply unit 20 fluidly connected to the four corner assemblies 16A-D. The air supply unit 20 includes an electronic control unit (ECU) 22, a compressor 24, a reservoir 26 and a valve block 30. The individual components of the air supply unit 20 may be assembled together or supported on the vehicle 10 at separate locations. In the embodiment shown, the electronic control unit 22 is located remote from the compressor 24, reservoir 26 and valve block 30 (electrical connections not shown). Alternatively, the air suspension system 12 may be an open loop system and the air supply unit 20 may not include a reservoir 26.

The air supply unit 20 is connected to the four corner assemblies 16A-D through the supply lines 28. In the example shown, the air suspension system 12 is a closed system. The valve block 30 is controlled by the electronic control unit 22 to regulate the air supply between the compressor 24, the reservoir 26 and the four corner assemblies 16A-D. The valve block 30 may be a single unit defining multiple valves, multiple valves located together, or multiple valves at different locations. Additionally, the reservoir 26 may be a single or multiple tank assembly.

While the embodiment disclosed has four corner assemblies 16A-D, the suspension system 12 may also be a system in which the front and rear axle are separately adjustable, and does not necessarily require separate adjustment at each of the corner assemblies 16A-D. The four corner assemblies 16A-D are adjustable to accommodate various driving conditions. Based upon the selected suspension mode the electronic control unit 22 will regulate the air supply between the compressor 24, reservoir 26 and the four corner assemblies 16A-D to adjust the four corner assemblies 16A-D from the current positions to the desired positions. When lowering any of the corner assemblies 16A-D the excess air is sent to the reservoir 26 for storage. When raising any of the corner assemblies 16A-D the required air is sent from the reservoir 26 to the appropriate corner assembly 16A-D. The compressor 24 ensures that the air pressure within the system 12 is maintained at the desired level. Alternately, in the instance of an open system the excess air is released to the environment or pulled from the environment and pressurized as needed. The compressor 24 ensures that the air pressure within the system 12 is maintained at the desired level.

The air suspension system 12 may be adjusted at the direction of the vehicle operator by moving a selector, or when pre-determined operating conditions exist, e.g. the vehicle 10 accelerates above a certain speed then the suspension system 12 is lowered, when the vehicle 10 decelerates below a predetermined threshold the suspension system 12 raised. Therefore, the air suspension system 12 may be adjusted while the vehicle 10 is in motion. In this instance, the front corner assemblies 16A, B may be adjustable together and the rear corner assemblies 16C, D may be adjustable together. To provide the most aerodynamic adjustment possible, when the vehicle is travelling in a forward direction, the rear corner assemblies are adjusted to the new position first when the suspension system 12 is raised. However, when the suspension system 12 is lowered, the front corner assemblies 16A, B are adjusted to the new position first. Alternately, each corner 16A-D could be adjusted separately, or all corners 16A-D could be adjusted simultaneously. The air suspension system 12 may also be adjusted in a stationary state of the vehicle. The corner assemblies 16A-D may be adjusted after the vehicle 10 have been loaded. For example, the vehicle 10 is then raised back to the normal ride height to compensate the loading.

Figure 2:
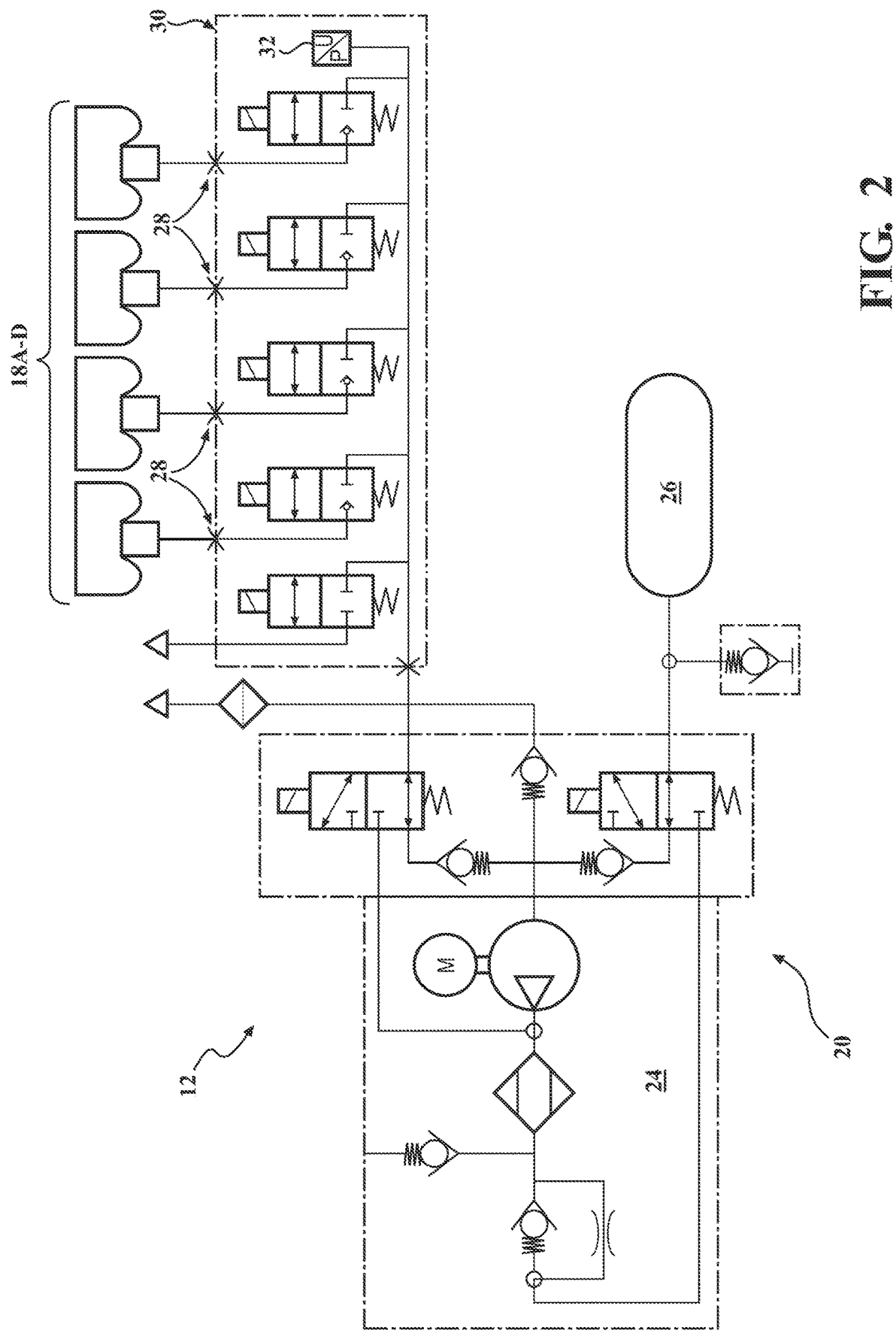
FIG. 2 is a pneumatic wiring diagram of the air suspension system shown in FIG. 1.

Referring to FIGS. 1 and 2, the solenoid valve block 30 has four air spring valves, an exhaust valve and a pressure sensor 32. The fluid lines 28 connect the reservoir 26 to the compressor 24, e.g. the fluid line 28 is a 6×1 mm tube, the compressor 24 to the valve block 30, e.g. the fluid line 28 is a 6×1.5 mm tube, and the valve block 30 to the air springs e.g. the fluid lines 28 are a 6×1.5 mm tube. The pressure sensor 32 may be proximate to or directly connected to the valve block 30.

The solenoid valve block 30 is used to manage the air flow between the system components 16A-D, 24, 26. The signal from the pressure sensor 32 can be used to determine a vehicle load. The vehicle load information is then used by the electronic control unit 22 to help determine the desired adjustments for the air suspension system 12, e.g. increasing height to accommodate for heavy vehicle load.

Therefore, a vehicle load calculation system comprises an air suspension unit 12 having four air spring corner assemblies 16A-D. One air spring corner assembly 16A-D is located at a suspension position corresponding to each of the wheel corners 18A-D for the vehicle 10 and an air supply unit 20 including an electronic control unit 22 is fluidly connected 28 to the air spring corner assemblies 16A-D. The air supply unit 20 is capable of independently adjusting the air spring corner assemblies 16A-D from one another.

One method of determining a vehicle load for a vehicle 10 equipped with an air suspension system 12 comprises detecting a pressure signal from a sensor 32 located within a valve block 30 for the air suspension system 12. The pressure sensor 30 determines the air pressure within each air spring. A vehicle load is calculated based at least on the pressure signal.

The method of determining the vehicle load comprises also signals from height sensors. Ride height sensors are associated with each corner assembly 16A-D. Those sensors can gather information on the current height at each of the corner assemblies 16A-D. Those sensors can gather information on the current height in stationary or moving state of the vehicle.

The detected information, including the height at each corner assembly 16A-D and the air pressure in each air spring are reported to the electronic control unit 22. The load calculation system uses the suspension electronic control unit 22 to calculate the vehicle load based at least on this information. The vehicle load at each corner assembly 16A-D or at the front and back axle can be calculated based on this information.

Furthermore, the determined vehicle load is corrected by subtracting loads resulting out of track width bindings. The overall vehicle load is calculated by subtracting a load value based on the track width from another load value based on the pressure a height data. The load value based on the track width is a result of acting vertical forces which are applied to the axle while the vehicle is lowered or raised. These kinematical characteristics (wheel trajectory) could be measured in advance and applicated by vehicle test via levelling up and down with sliding plates. Height data points will be assigned to a track width. This leading to predetermined values for a vehicle load based on the changed track width.

Figure 3A:
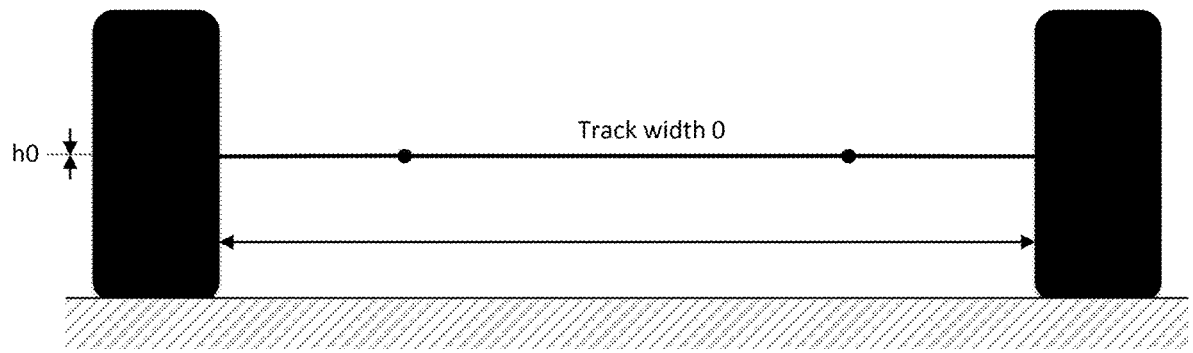
FIGS. 3a and 3b are diagrams illustrating an exemplary change of track width.
Figure 3B:
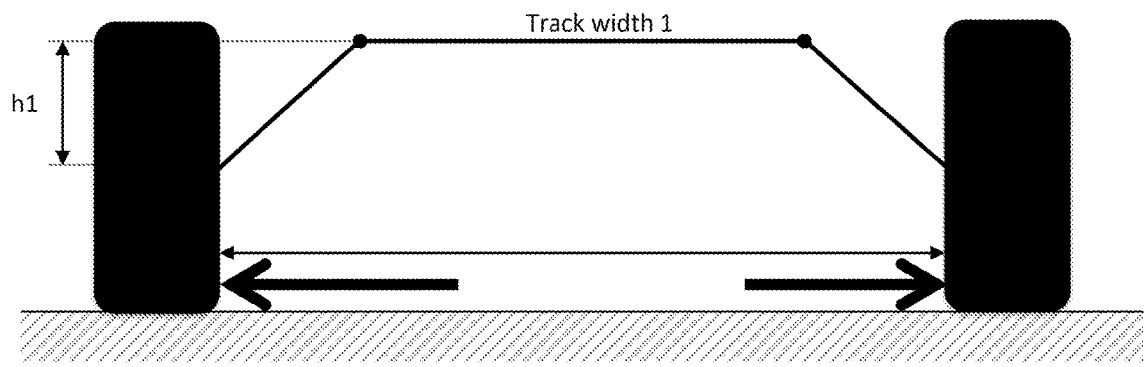

Referring to FIGS. 3a and 3b a change of track width of a vehicle axle is exemplary shown. In FIG. 3a the vehicle is at standstill and for example in its lowest height h0. At this first height the track width 0 for example is 1610 mm. At this point the proposed method stores the current track width at the current height. This is followed by an up-level request. Therefore, as shown in FIG. 3b the vehicle height is increased to a second height h1. For example, the vehicle was raised by 60 mm. At this height h1 the track width 1 will be 1590 mm. Meaning the track width changed due to an up-level request from 1610 mm to 1590 mm. Thus, the change of track width is 20 mm. While the vehicle is raised the tires are pulled inwards. Due to the kinematical characteristics a vertical force is applied to the corner assemblies of that axle. The road friction results in a counter force acting on the tires indicated by the bold arrows showing outwards.

Due to the wheel trajectory this force is transitioned to the vertical force acting on the corner assemblies. This force distorts the correct calculation of the vehicle load. Therefore, a correction load value is determined. The proposed determination takes the change of track width into account. The changed track width value will be multiplied by a constant stiffness factor. This constant stiffness factor is predefined for the specific suspension characteristics of each vehicle. Furthermore, the current coefficient of road surface friction can be applied to the constant stiffness factor. By multiplying the changed track width value with the constant stiffness factor the vertical acting force on the corner assemblies is calculated. In order to calculate the correction load value, the vertical acting force is divided by the acceleration of gravity (9.81 m/s$^2$). This calculation leads to a correction load value which then can be subtracted from the standard vehicle load calculation. The standard vehicle load calculation is based on the air spring pressure and vehicle height. Thus, by taking the change of track width into account a more accurate calculation of vehicle load is performed.

The increased accuracy of the load detection can be used to more finely adjust the suspension system 12 based on the provided readings. In addition, the increased accuracy can be used to more closely monitor load (especially on the rear axle for a pick up) to prevent overload situations and provide a more robust measurement for failsafe operation in overload conditions. In fact, the overall high payload specification may even be increased due to the increased measurement accuracy that is available to the system because the load measurement is more accurate the design margin to protect against overloading situations can be smaller.

Figure 4:
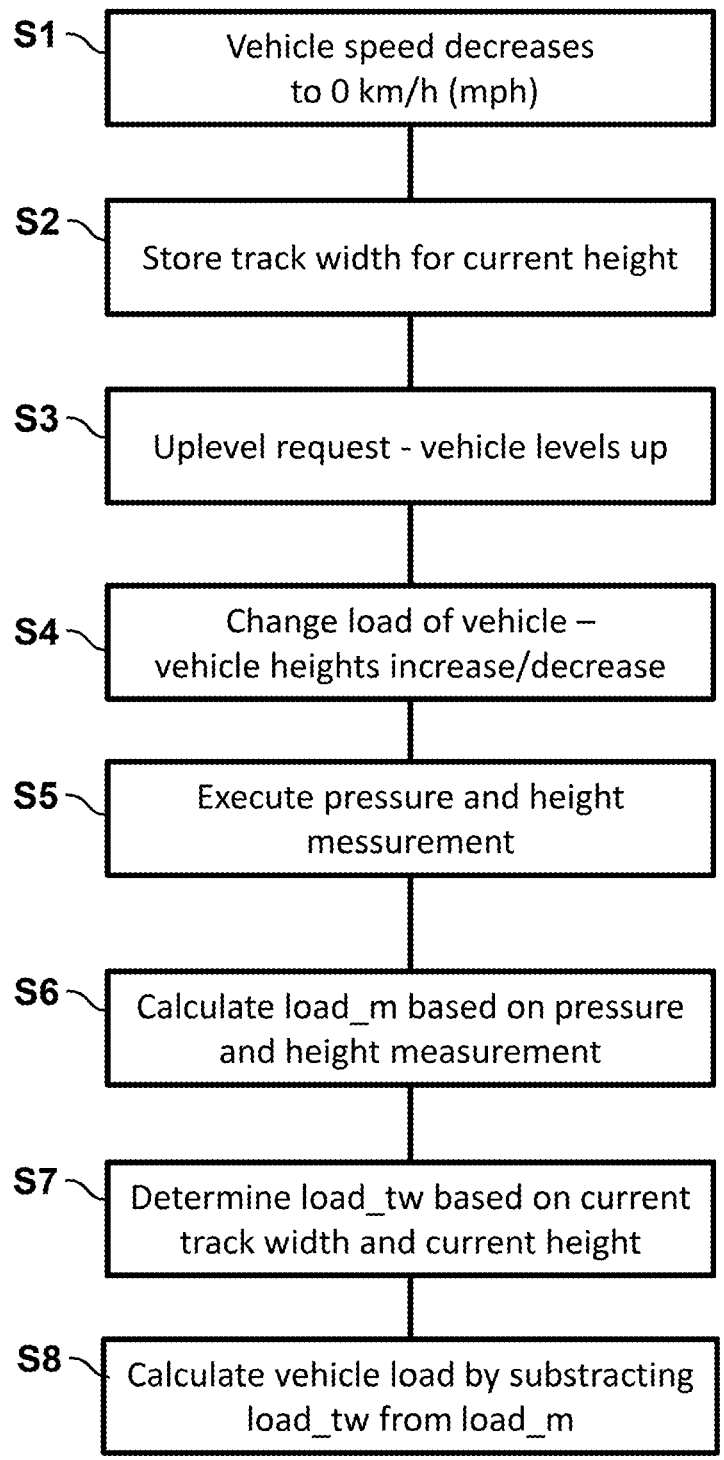
FIG. 4 is a flowchart of a method for calculating the vehicle load.

Referring to FIG. 4 is a flowchart illustrating a method of determining a vehicle load. The method comprises the following steps. In step S1 the vehicle speed decreases to 0 mph, so the vehicle is in a stationary state. In step S2 the current track width for the current height is stored in the electronic control unit.

In step S3 there is an uplevel request. Either by the driver or the autonomous vehicle itself. Thereafter the vehicle height is raised. In step S4 a change of load of the vehicle takes place. Thus, i.e. the vehicle height is decreased.

In step S5 a measurement of the air pressure and the current height is fulfilled. This leading in step S6 to a calculation of a first vehicle load value load_m based upon the pressure and height measurement.

In step S7 a second vehicle load value load_tw is determined by taking the track width at the current height into account. The track width of an axle applies a specific vertical force to the suspension at a specific height. Due to this kinematical characteristic a look-up table is provided containing specific load values for each type of vehicle.

Finally, in step S8 the overall and accurate vehicle load can be calculated by subtracting the second vehicle load value from the first vehicle load value.

While embodiments have been described in detail the true scope of the disclosure should not be so limited, since those familiar with the art to which this disclosure relates will recognize various alternative designs and embodiments for practicing the concepts within the scope of the appended claims.

What is claimed is:

1. A vehicle load calculation system comprising:
an air suspension system having four corner assemblies, wherein each corner assembly among the four corner assemblies is located at a respective suspension position corresponding to a respective wheel corner of a plurality of wheel corners of a vehicle and the four corner assemblies each comprise an air spring, wherein two corner assemblies of the four corner assemblies are associated with a vehicle axle of a plurality of vehicle axles;
an air supply unit configured to adjust air pressure within each air spring;
a pressure sensor located at a valve block of the air supply unit, wherein the pressure sensor is configured to measure the air pressure in each air spring;
a plurality of height sensors, wherein each height sensor of the plurality of height sensors is located at the suspension position corresponding to the respective wheel corner of the plurality of wheel corners of the vehicle, wherein each height sensor of the plurality of height sensors is configured to measure a height for an associated corner assembly of the four corner assemblies;
an electronic control unit connected to the four corner assemblies, wherein the electronic control unit is configured to calculate a vehicle load from a first vehicle load value calculated based on the air pressure in each air spring measured by the pressure sensor and the height measured by each of the plurality of height sensors associated with the respective vehicle axle of the plurality of axles and a second vehicle load value determined based on a change of track width of the respective vehicle axle; and
wherein the change of track width is multiplied by a constant stiffness factor to calculate a vertical force acting on the two corner assemblies of the axle.

2. The vehicle load calculation system of claim 1, wherein the change of track width is determined by a change of vehicle height from a first vehicle height to a second vehicle height.

3. The vehicle load calculation system of claim 2, wherein the first vehicle load value is calculated at the second vehicle height.

4. The vehicle load calculation system of claim 1, wherein the second vehicle load value is calculated by dividing the vertical force acting on the two corner assemblies of the axle by the acceleration of gravity.

5. The vehicle load calculation system of claim 1, wherein the constant stiffness factor is predefined for the air suspension system of each vehicle.

6. The vehicle load calculation system of claim 1, wherein a coefficient of road surface friction is applied to the constant stiffness factor.

7. The vehicle load calculation system of claim 1, wherein the vehicle is in a stationary state.

8. The vehicle load calculation system of claim 1, wherein the vehicle load calculation is performed for each vehicle axle of the plurality of vehicle axles of the vehicle.

9. A method of calculating a vehicle load, the method comprising:
measuring a plurality of air pressures in a plurality of air springs located at a respective suspension position corresponding to each wheel corner of a plurality of wheel corners of a vehicle;
measuring a plurality of heights at the suspension position corresponding to the respective wheel corners of the plurality of wheel corners of the vehicle;
calculating a first vehicle load value based on air pressures of the plurality of air pressures and heights of the plurality of heights associated with a vehicle axle of the vehicle;
determining a second vehicle load value based on a change of track width of the vehicle axle;
calculating the vehicle load based on the first vehicle load value and the second vehicle load value;
calculating a vertical force acting on corner assemblies of the axle by multiplying the change of track width by a constant stiffness factor; and
adjusting at least one air pressure of the plurality of air pressures based on the calculated vehicle load.

10. The method of calculating the vehicle load of claim 9, further comprising determining the change of track width based on a change of vehicle height from a first vehicle height to a second vehicle height.

11. The method of calculating the vehicle load of claim 10, wherein calculating the first vehicle load value comprises calculating the first vehicle load value at the second vehicle height.

12. The method of calculating the vehicle load of claim 9, wherein determining the second vehicle load value comprises calculating the second vehicle load value by dividing the vertical force acting on the corner assemblies of the axle by the acceleration of gravity.

13. The method of calculating the vehicle load of claim 9, wherein the constant stiffness factor is predefined for suspension of the vehicle.

14. The method of calculating the vehicle load of claim 9, further comprising applying a coefficient of road surface friction to the constant stiffness factor.

15. The method of calculating the vehicle load of claim 9, wherein calculating the vehicle load comprises calculating the vehicle load in a stationary state of the vehicle.

16. The method of calculating the vehicle load of claim 9, wherein calculating the first vehicle load value comprises calculating the first vehicle load value based on air pressures of the plurality of air pressures and heights of the plurality of heights associated with each vehicle axle of a plurality of vehicle axles of the vehicle.

* * * * *